United States Patent
Rundle et al.

[11] Patent Number: 5,899,100
[45] Date of Patent: May 4, 1999

[54] TRANSMISSION LOCK DEVICE

[76] Inventors: Christopher Rundle, 12598 SW. 60th Ct., Miami, Fla. 33156; Michael Borell, 7787 SW. 86th St., Apt. 310, Miami, Fla. 33143

[21] Appl. No.: 08/814,440

[22] Filed: Mar. 10, 1997

Related U.S. Application Data

[62] Division of application No. 08/413,478, Mar. 30, 1995, Pat. No. 5,609,049.

[51] Int. Cl.⁶ .................................................. B60R 25/06
[52] U.S. Cl. ................................ 70/202; 70/164; 70/246; 70/247
[58] Field of Search ...................... 70/245–248, DIG. 58, 70/198–203, 158, 163–173, 237, 177, 178, 180, 196, 197, 254; 180/287

[56] References Cited

U.S. PATENT DOCUMENTS

| | | | |
|---|---|---|---|
| 1,247,512 | 11/1917 | Dobler | 70/202 |
| 1,280,896 | 10/1918 | Stroeh et al. | 70/203 |
| 1,815,417 | 7/1931 | Miller | 70/202 X |
| 3,556,571 | 1/1971 | Laub, Jr. | 70/165 X |
| 3,710,606 | 1/1973 | Prince | 70/247 X |
| 3,739,608 | 6/1973 | Young | 70/DIG. 58 X |
| 5,020,390 | 6/1991 | Chang | 70/202 X |
| 5,038,667 | 8/1991 | Slater | 70/247 X |
| 5,125,249 | 6/1992 | Fields et al. | 70/30 |
| 5,239,849 | 8/1993 | Gallardo | 70/209 |
| 5,361,613 | 11/1994 | Fort et al. | 70/247 |
| 5,410,896 | 5/1995 | Gleason | 109/34 X |

FOREIGN PATENT DOCUMENTS

| | | | |
|---|---|---|---|
| 542838 | 12/1955 | Belgium | 70/202 |
| 473549 | 5/1951 | Canada | 70/164 |
| 603983 | 1/1926 | France | 70/202 |
| 919367 | 3/1947 | France . | |
| 1356917 | 2/1964 | France | 70/203 |
| 322171 | 11/1929 | United Kingdom | 70/DIG. 58 |

*Primary Examiner*—Lloyd A. Gall

[57] ABSTRACT

The instant invention is a locking mechanism for transmissions having a floor mounted selector switch. The invention utilizes a base member which is attached to a support post of the transmission selector lever. The base member includes provisions for holding loose coins and miscellaneous items. When the vehicle is left unattended, the locking mechanism utilizes a spherical cap which locks to the base member. With automatic transmissions the handle is locked together so as to conceal the handle and prevent access to the actuator button. When used in combination with a manual transmission, the cap engages the base of the transmission housing to prevent depression or movement of the selector handle. In this manner, the vehicle cannot be moved as the transmission is disabled. The spherical shaped cap inhibits cutting, tensile steel bands used on matching caps prevent the mechanism from being pried apart when locked.

5 Claims, 4 Drawing Sheets

TRANSMISSION LOCK DEVICE

This is a divisional of application Ser. number 08/413,478 filed on Mar. 30, 1995, now U.S. Pat. No. 5,609,049.

FIELD OF THE INVENTION

This invention relates generally to anti-theft devices for motor vehicles and in particular to a device for locking the shifting lever of a floor mounted automatic transmission.

BACKGROUND OF THE INVENTION

Automobile theft is an international problem that affects every individual; either through theft of their own vehicle or as part of a class whose insurance premiums are raised to help others whose vehicles have been stolen. To this end, numerous anti-theft devices have been patented disclosing products designed to primarily reduce unattended vehicle theft.

While it is common knowledge that anti-theft devices are inept from stopping a professional thief, there are numerous devices available to deter theft. Such devices include alarm systems which require coupling to the vehicle's electrical system using the horn and headlights in hopes of exposing a thief. A siren may also be used to draw attention to the vehicle as well as an ignition cut-off switch for use in disabling the vehicle.

The aforementioned alarm systems require extensive wiring, yet typically fail to prevent all aspects of vehicle entry. For instance, a conventional alarm system may be bypassed by breaking a window so as to gain access to the vehicle for disabling an alarm. Shaker boxes can be installed to detect vehicle movement yet are easily triggered by a gust of wind or sound vibrations, such as jet aircraft, leading to a false alarm. Due to the frequency of false alarms, some close communities such as condominiums charge vehicle owners for the cost of responding to a false alarm. In addition, due to the frequency of false alarms it is not uncommon for most people to simply ignore the alarm.

Passive alarm systems such as steering wheel locks have recently become a consumer favorite. The visibility of the lock is believed to be the greatest deterrent against theft. Once installed, the steering wheel lock prevents circular rotation of the steering wheel, inhibiting use. The problem with a steering wheel lock is that most steering wheels are constructed of plastic, or have a thin metal band surrounded by plastic, which is easily cut allowing removal of the steering wheel lock.

Another type of lock, to which this invention addresses, is for use with vehicles having a floor mounted transmission selector. Numerous motor vehicles utilize a transmission selector positioned between the driver and front passenger seat to allow the operator of a vehicle to place the transmission into a proper gear. Transmission selectors typically include a push button actuator so as to prevent accidental movement of the selector.

Transmission selector enclosures inhibit a would be thief from depressing the selector release actuator thus preventing movement of the vehicle. The problem with prior art devices is that the transmission selector is not universal and lock devices must be customized to the particular shape of the selector lever thereby frustrating the use of such devices on vehicles having unique shaped selector levers. For instance, one type of vehicle may have a T-shaped selector with a push button actuator located on an end of the shift mechanism while another vehicle may have a cylindrical shaped selector with a push button actuator mounted on the top.

U.S. Pat. No. 5,125,249 attempts to address this problem by setting forth a multi-shaped transmission locking mechanism designed to accommodate various sized selectors. The manufacturing costs of such a locking device is prohibitively expensive as the device has numerous compartments. In addition, the device requires a separate mounting attachment for securing a cable lock. This requires mounting holes to support the bracket in position and if the bracket is bolted to the frame, it can be easily removed by the thief. If the bracket is welded or attached by one way screws the device cannot be moved should the vehicle be sold.

Thus, what is needed in the art is a simplistic transmission selector locking mechanism that is highly visible and will accommodate the various types of transmission selectors currently on the market as well as provide the consumer with a single device that can be moved from vehicle to vehicle without modification to the vehicle.

SUMMARY OF THE INVENTION

The present invention satisfies this need through provision of an anti-theft device that fits onto the selector lever of a console mounted automatic or manual transmission having a shape to accommodate both spherical and T-shaped transmission selector levers as well as allow for transfer from one vehicle to another.

In general, the instant invention operates to disable the transmission selector lever by concealing the actuator button so as to prevent an unauthorized user of vehicle from shifting the transmission from a parked or neutral position. The device utilizes a base mount which is coupled to the support post of a transmission selector lever. The base is maintained in position for as long as the owner wishes to use the locking mechanism on the vehicle. The base has two component members that are coupled to the transmission selector support post so as to frictionally engage the post to prevent movement.

When the base member is not used for locking purposes, provisions are made for placement of coins therein by use of spring loaded coin selector slots on one side member. An open receptacle on the opposite side member is available for receipt of miscellaneous items on the device used with automatic transmissions. The base members are preferably spherical in shape and upon securement to the transmission support post, frictionally engage the post to prevent slidable movement along the length of the post.

When it is desired that an automatic transmission is locked in position, a spherical ball assembled by two matching caps is coupled to the base portion. The caps form a hollow center which encompasses the transmission selector handle. The caps form a housing which is operatively associated with the base member having a lower portion which accommodates an outer surface of the base member and a centrally disposed ridge which projects over an upper edge of the base member to prevent both vertical and horizontal movement of the housing once installed. The two caps of the spherical ball are coupled to each other by an insert and twist arrangement having engagement tabs on one cap which engage receptacles on the opposite cap using a key lock so as to maintain the portions in a single housing.

Once locked in position, the housing cannot be moved so as to force engagement of the actuator button. The use of a housing relying on a base member allows the device to be used on either T-shaped or spherical shaped transmission selector handles as well as be transferred from vehicle to vehicle. The housing is preferably opaque and constructed of a material that cannot be easily cut by a hacksaw. It is noted that the shape of the housing makes it extremely difficult for cutting, thereby allowing use of lower cost materials while maintaining the inability to cut the device. For this reason, items may be safely located in the device while the owner is away from the vehicle. For instance, the owner may place his wallet and keys, except the housing lock key, into the interior chamber of the device allowing the owner to safely store the items while at the beach or engaged in any other activity where it is difficult to carry items.

An alternative embodiment to the instant invention is for use with a manual transmission. The device utilizes a base mount which is coupled to the support post of a transmission selector lever. The base is attached in an inverted position as compared to the automatic transmission base and is securely coupled to the selector lever for as long as the owner wishes to use the locking mechanism on a particular vehicle. The base has two component members that are coupled to the transmission selector support post which frictionally engage the surface of the post to prevent vertical movement.

Similar to the automatic transmission base member, provisions are made for placement of coins therein by use of spring loaded coin selector slots on one side member. In this embodiment, the coins are inserted from beneath the face member and are spring loaded for ease of access.

When it is desired that a manual transmission is locked in position, a member consisting of a single globe is placed over a handle on the transmission selector lever and placed over the base member. Provisions in the base member allow for engagement of a locking tab located on the inner surface of the spherical ball housing. The housing is then locked to the base member by use of a lock mechanism that inserts through an aperture provided on the outer surface of the housing and is available for placement in a juxtaposition to the base member. The lower perimeter of the spherical housing is positioned against the upper surface of the transmission support housing such as the floorboard of an automobile. The spherical housing operates to maintain the transmission lever in a raised position so as to prevent movement of the transmission lever into any gear as well as to disallow the engagement into primary gears such as reverse and first which require the transmission lever to be depressed for movement into primary gears.

Thus an objective of the instant invention is to provide a low cost anti-theft device which locks the transmission selector of a vehicle having a center mounted transmission.

Yet another objective of the instant invention is to teach the use of a transmission selector device which prevents both the horizontal and vertical movement of a housing used to enclose the selector thereby preventing depression of the actuator button.

Still another objective of the instant invention is to provide a universal base member for the locking mechanism which further provides a lockable holding area for coins and miscellaneous items.

Yet still another objective is to provide a selector locking device that accommodates both T-handle and spherical shaped transmission selector handles.

Still another objective of the instant invention is to provide a locking mechanism for use with manual transmissions that prevents the depression of the transmission lever in movement to any gear by use of an adjustable spherical housing that engages the support housing of a transmission lever.

Still another objective of the instant invention is to provide a locking mechanism that can be transported from vehicle to vehicle with minimal effort and without damage to the vehicle or locking mechanism.

Other objectives and advantages of our invention will become apparent from the following description taken in conjunction with the accompanying drawings wherein are set forth, by way of illustration and example, certain embodiments of our invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in the art that various modifications, rearrangements and substitutions can be made without departing from the spirit of the invention. The scope of the invention is defined by the claims appended hereto.

Figure 1:
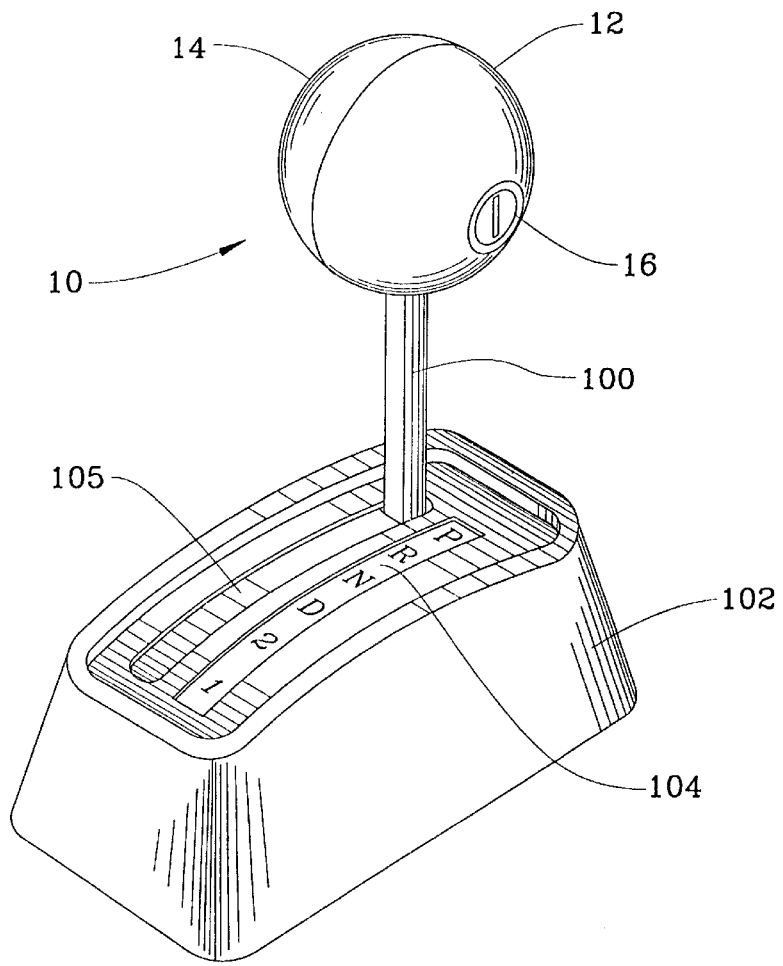
FIG. 1 is a pictorial view of an installed transmission selector lock device according to the instant invention.

Referring to FIG. 1 shown is a pictorial view of the instant invention 10 mounted to a support post 100 of a floor mounted automatic transmission shifting housing 102. The types of transmissions that the instant invention is particularly suited for are center mounted consoles that are placed between the driver and passenger seat of a motor vehicle having the gear selector position indicator 104 viewable by the operator of the vehicle and a handle release mounted actuator button, now shown. The transmission support post 100 is movable along the longitudinal length of the housing 102 through slot 105 until the support post is positioned next to a particular drive position that the operator intends to utilize.

By way of illustration, FIG. 1 depicts the instant invention 10 as installed having a first half spherical shaped cap 12 coupled to a second half spherical shaped cap 14 which encompasses an end of a support post 100 having a selector handle and actuator button used to move the support post. When the caps 12 and 14 are coupled together the transmission handle and finger operated transmission handle release are unavailable for depression thereby denying a thief the ability to depress the actuator to release the vehicle from a parked position. Caps 12 and 14 can be made of any opaque rigid material such as plastic or steel, thereby denying the thief the ability to determine where the finger operated transmission handle release is located. In addition, when the caps are constructed of a cut resistant material such as stainless steel or chrome plated steel, a thief is further denied the ability to cut the lock with a saw blade due to the shape of the caps. Also shown is the locking mechanism 16 which is operated by a key to secure caps 12 and 14 to each other in a locked position.

Figure 2:
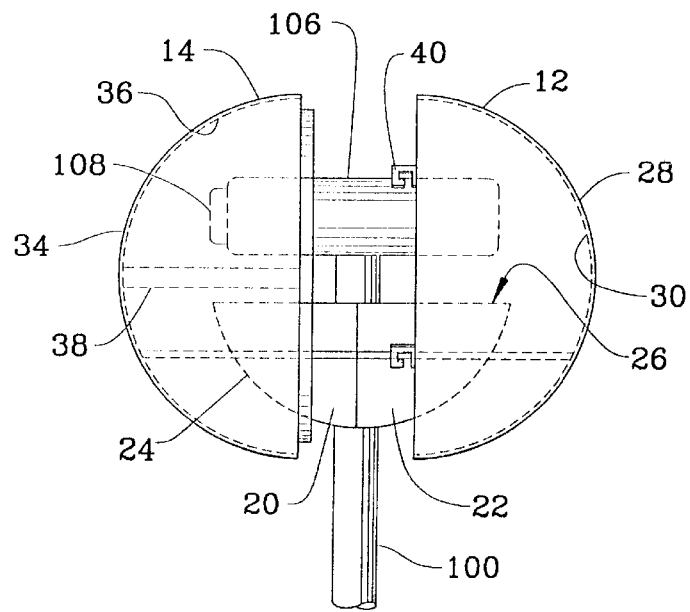
FIG. 2 is a view depicting a base secured to the transmission post with caps in position available for locking the selector handle in position.

Referring to FIG. 2, shown is a partial exploded view of the instant invention wherein cap 12 is separated from cap 14 depicting transmission support post 100 with the selector handle 106 mounted to the top of the support post 100. In this embodiment the handle 106 is a T-handle having an actuator button release mechanism 108 located on an end of the T-handle which requires depression in order to move the support post 100 to select the particular gear for movement of the vehicle. For instance, when a vehicle is started, an automatic transmission is maintained in a parked position. After the operator has started the vehicle, the transmission may be shifted from a park position to a drive position by depressing actuator button 108 and pulling handle 106 allowing movement of support post 100. The caps 12 and 14 are maintained in position by the use of a support base defined by a first member 20 and a second member 22 which are bolted to each.

When each member of the support base is coupled together, a support surface 24 is formed with an upper surface 26 which forms a horizontal plane perpendicular to the support post 100. The support surface 24 provides maintenance of the caps 12 and 14 in a upright position while the upper surface 26 is used to engage raised ridge 38 within cap 14, and a portion of the key lock mechanism in cap 12 wherein the internal portion of the key lock, not shown, is positioned upon the surface 26 prohibiting movement of the housing 12, to prevent the caps from moving, out of position by maintaining constant engagement with the internal surface of first member 20 and second member 22. Cap 12 has an outer surface 28 and an inner surface 30. The outer surface 34 of cap 14 forms a spherical ball when coupled to cap 12 having outer surface 28. Raised ridge 38 is positioned for placement directly over upper surface 26 to prevent movement of the cap 14 in a downward position over the base. When caps 12 and 14 are placed next to each other, hooked end bands 40 of cap 12 are available for insertion into receptacles 58, shown in FIG. 4 located on cap 14 which allow the two caps to be locked into position concealing handle 106 and actuator 108.

Figure 3:
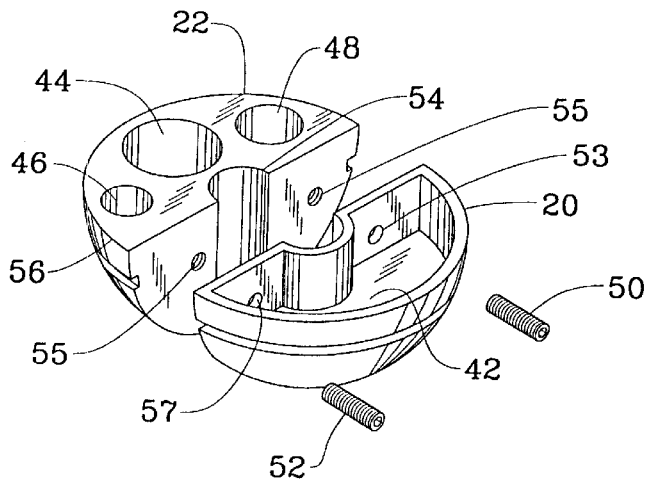
FIG. 3 is a perspective view of the base member for the selector lock device.

Referring to FIG. 3 shown is the top view of the base member. The first member 20 is shown having a chamber 42 used for placement of miscellaneous items. Second member 22 has spring loaded depression holders 44 to store quarters, depression holder 46 to store dimes, and depression holder 48 to store nickels. Second member 22 allows for coupling to the first member 20 by use of a first allen screw 50 insertable through aperture 53 of the chamber area 42 of the first member 20 for threadingly engaging threaded aperture 55 of second member 22. Similarly a second allen screw 52 is located on the opposite side of post aperture 54 allowing the two half members to be securely fastened to the support post by insertion through aperture hole 57 in chamber 42 of the first member 20 for threadingly engaging threaded aperture 55 of second member 22.

By use of allen head screws 50 and 52, the device can be installed by use of an allen head wrench which allows for tightening in a small area such as the chamber. The screws are threaded into the side wall so as to conceal their location yet allow uninhibited access to the chamber area 42. Aperture 54 is sized for placement around the transmission support post and may include a friction enhancing surface such as rubber. Each member 22, 24 is preferably made from thermoplastic having the ability to conform to the post should a small post be used by drawing the first member 22 to the second member 24. Similarly, an over sized support post can be accommodated wherein members 22 and 24 are drawn together thereby allowing the base to maintain the caps in a fixed position by maintaining a circumference 56 of a size that will allow for frictional engagement to the inner surface of the caps.

Figure 4:
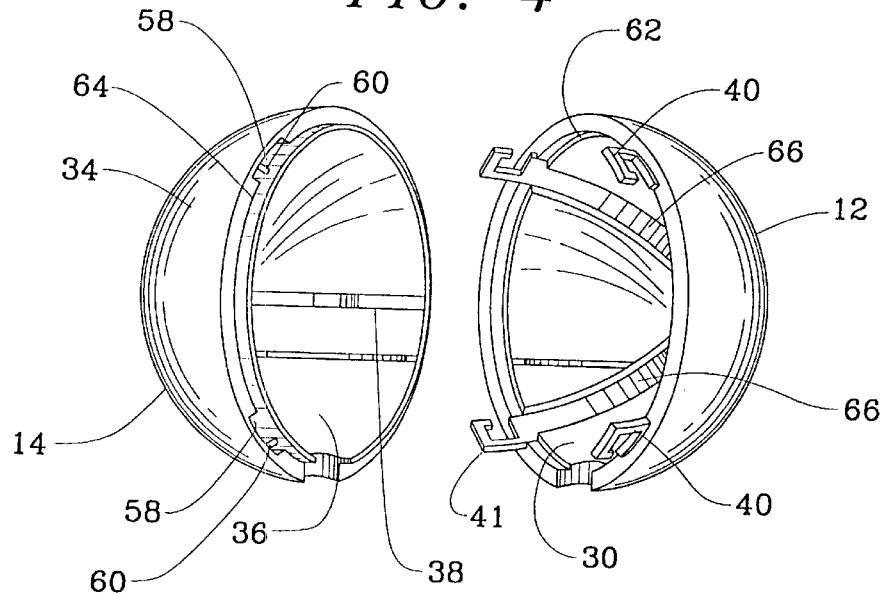
FIG. 4 is an exploded view of the caps illustrating the cavity formed therein.
Figure 5:
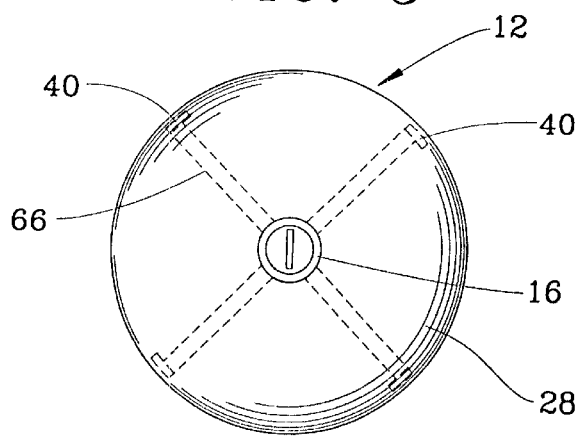
FIG. 5 is an end view of the locking cap having a key hole integrated into a sidewall of the cap.

Now referring to FIGS. 4 and 5, cap 12 is shown with interior surface 30 having engagement lock steel band 40 located around the cylindrical opening for engagement to receptacles 58 of cap 14. The ends of the lock steel band 40 have a hook shape 41 which allow for insertion into receptacles 58. The bands are then rotated so as to engage tabs 60 by placement of the opening of the hook 41 over the tabs 60 which spans across the opening of the receptacle 58. The bands are placed in position by grasping cap 14 and rotating cap 12 once the bands are inserted, wherein the bands are then pulled tight by rotation of the key lock 16 which causes band straps 66 to retract within the hollow section of the cap thereby locking cap 12 to cap 14 forming a uniform housing. To assist in alignment and prevent prying of the caps a receptacle 62 is located on the peripheral opening edge of cap 12 for receipt of circumferential tab 64 set forth on the peripheral edge of cap 14.

Once the caps 12 and 14 are secured together, it is noted that the ability to cut a spherical shaped housing is limited which prevents a would be thief from effectively sawing through any particular lock steel band 40 or the key lock mechanism due to the inability to support a band saw on a spherical surface. In addition, should a cut be attempted to be made across the adjoining sections, it is noted that the transmission selector handle will effectively impede sawing through the bands to prevent separation of the caps. As the side wall between inner surface 36 and outer surface 34 of the cap is of a nominal thickness, the receptacle 62 and matching circumferential tab 64 does not allow for sufficient area in which a pry bar could be used to split the halves apart. The enlarged surfaces shown in FIG. 4 are for illustration purposes only. Upper tab 38 is positioned above the surface of the coupling base. The use of flexible metal bands 66 in conjunction with the bands 40 help deter removal of the lock 16 by requiring the supporting load to be transferred to the adjoining end cap providing a spring type movement so as to interfere with the slide hammer action of a conventional lock removal tool.

Figure 6:
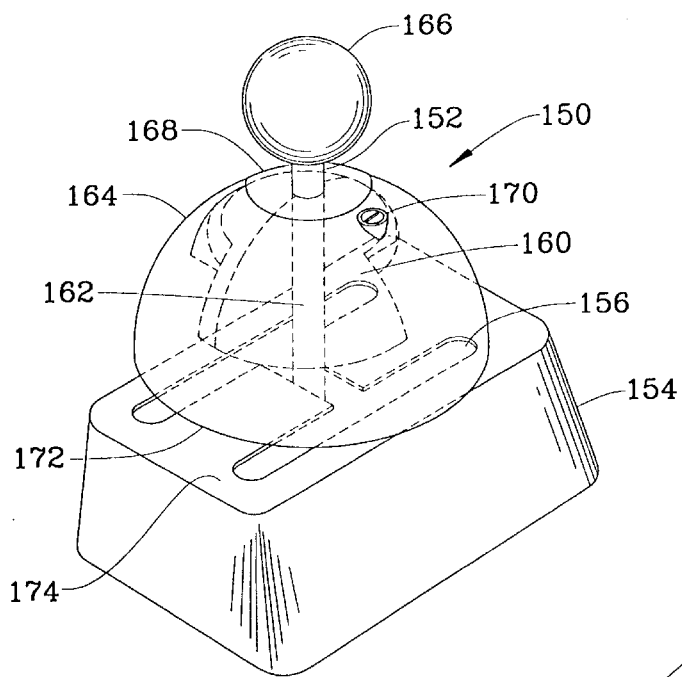
FIG. 6 is a pictorial view of an installed transmission selector lock device according to an alternative embodiment of the instant invention for use with manual transmissions.

FIG. 6 illustrates a pictorial view of the device 150 installed on a transmission lever 152 having a transmission housing 154 and illustrating a conventional H pattern 156 used with three speed transmissions wherein the neutral position is at a location in the middle of the H. By way of illustration, the instant invention consists of an inverted base member 160 which is secured to the support post 162 of the transmission wherein housing 164 is coupled to the support base 160 by placement over handle 166 by use of aperture 168 located on the top portion of the housing wherein a tab located on the inner surface of the housing 164 engages base member by rotation allowing for insertion of lock 170 so as to secure the housing to the base member. Once the base member 160 and housing 164 are locked in position, a housing perimeter 172 of housing 164 engages an upper surface 174 of the transmission housing 154 preventing the lateral movement of the support post 162 to any of the gears represented by the H pattern 156. In addition, it is noted that a majority of transmissions require depression of the handle 166 approximately one inch into the transmission housing 154 in order to engage primary gears such as first gear and reverse gear. This safety prevents accidental placement of the transmission into a primary gear while the vehicle is moving to protect the transmission from improper movement. For this reason, proper engagement of base member 160 allows for the frictional engagement of the housing perimeter 172 to prevent the handle 166 from being depressed thereby further acting to eliminate the ability to move the transmission into a primary gear as well as secondary gears.

Figure 7:
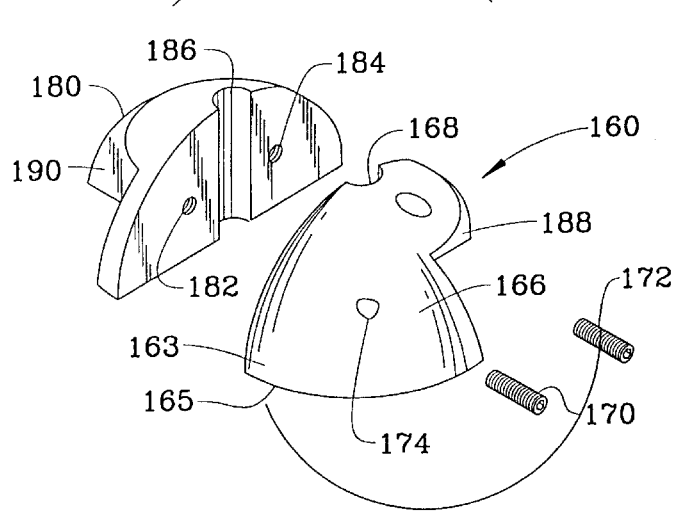
FIG. 7 is a perspective view of the base member used for the manual transmission.

Now referring to FIG. 7 shown is the support base 160 having a first member 163 with a flat bottom 165 and an outer surface 166 in the shape of a ball. Partial aperture 168 is placed along an inner surface for accommodating the transmission support post. Fastener 170 is available for insertion through aperture 174 for coupling to second member 180 by engagement of threaded aperture 182. Similarly, fastener 172 is inserted through an aperture, not shown, on first member 163 for insertion into fastener hole 184 thereby securely fastening the support members to each other. Partial aperture 186 forms a mirror image of aperture 168 for placement around the transmission support. The first member 163 includes a formed cutout 188 used to engage the housing as later described in this specification. Similarly, cutout 190 is provided with the second support member for use in engaging a tab mounted on the inner surface of the housing.

Figure 8:
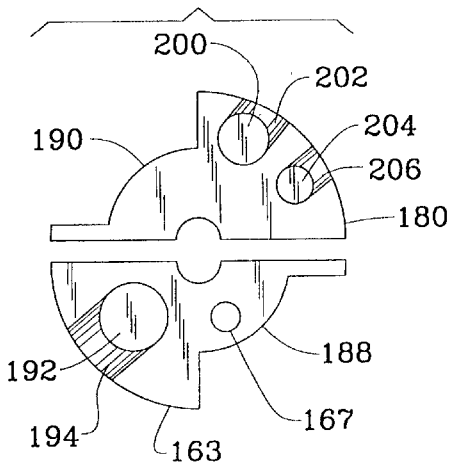
FIG. 8 is a bottom view of FIG. 7 illustrating coin holders.

FIG. 8 sets forth a bottom view of FIG. 7 with cutout 188 shown on the first member 163 and cutout 190 set forth on second member 180. As shown by way of illustration first member 163 includes a spring loaded coin holder 192 having lead-in detent 194 with a surrounding lip allowing a coin such as a quarter to be slid into the holder by depression of the coin holder 192 and engagement of a corner edge provided by slot 194. The second base also provides location for coins by use of a spring loaded nickel holder 200 having lead-in slot 202 and a dime holder 204 having lead-in slot 206. Key hole 167 allows insertion of a key lock mechanism for locking said cap to side member.

Figure 9:
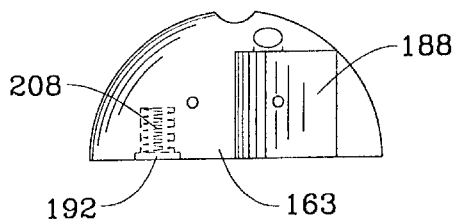
FIG. 9 is a side view of the base member.

FIG. 9 is a side view of FIG. 8 showing the first base member 163 with cutout 188 and coin holder 192 with spring 208 biasing the coin holder 192 in an outward position.

Figure 10:
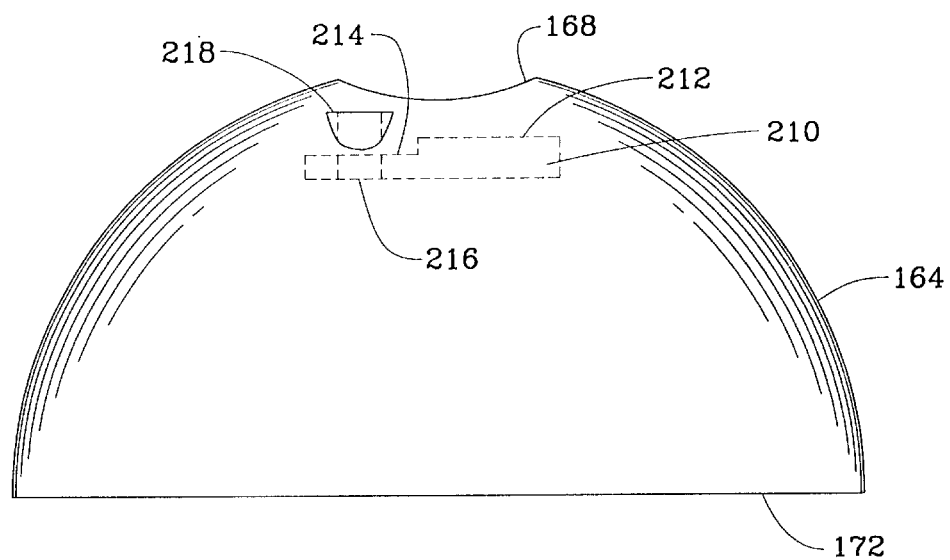
FIG. 10 is a side view of the housing used in conjunction with the base member.

Now referring to FIG. 10 shown is the housing 164 having a lower perimeter edge 172 and an upper aperture formed by perimeter edge 168. The housing 164 is shown with a break away portion revealing tab 210 having a raised lip 212 and a lower lip 214. The lower lip allows insertion beneath the base member with the upper lip 212 engaging beneath each cutout allowing securement to the base member. Key hole opening 216 is available for insertion of a key lock mechanism as previously described, housing through hole 218 provides external fixation of the key lock.

Figure 11A:
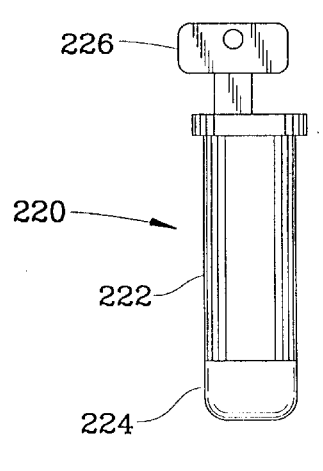
FIGS. 11A–C is a multiple view illustrating the key locking mechanism in various positions upon rotation of a key.
Figure 11B:
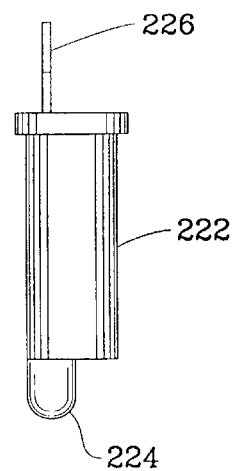
Figure 11C:
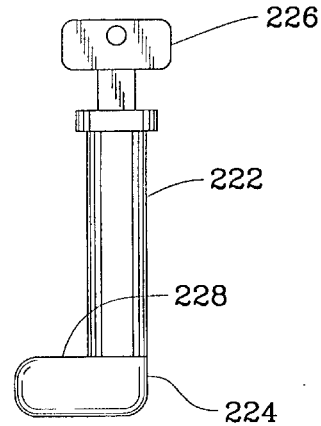

FIG. 11 illustrates the key member 220 having a body member 222 with an angular member 224 having an upper surface 228 operated by a key such as that illustrated by numeral 226 as shown by illustration B, the key 226 is rotated causing angular member 224 to be rotated in relation to body member 222.

It is to be understood that while we have illustrated and described certain forms of our invention, it is not to be limited to the specific forms or arrangement of parts herein described and shown. It will be readily apparent to those skilled in the art that various changes may be made without departing from the scope of the invention and the invention is not to be considered limited to what is shown in the drawings and described in the specification.

What is claimed is:

1. An anti-theft device for disabling a floor mounted manual transmission selector in motor vehicles having a support post and a selector handle, said device comprising: a base having a first member and a second member forming an inverted structure with an upper substantially semi-spherical shaped wall surface and a substantially flat lower wall; means for coupling said first member to said second member for frictionally engaging the support post therebetween; a housing means having an interior chamber and operatively associated with said base, said housing means having a tab disposed in said chamber operatively associated with a locking detent allowing for the rotational securement of said housing means to said base, said housing means having a lower perimeter edge, and a lock means for preventing the rotation of said housing means when said tab is inserted into said detent; wherein said base is adapted to be secured to the support post and said housing means is attached to said base when the transmission is to be locked by placement over the selector handle wherein said tab is insertable into said detent by rotation of said housing means with said perimeter edge adapted to engage an upper surface of a transmission housing, said lock means insertable into said housing means preventing rotation of said housing means.

2. The anti-theft device according to claim 1 wherein each said base member includes a means for holding coins.

3. The anti-theft device according to claim 1 wherein said first member and said second member include mirror image cutouts operatively associated with an engagement tab located on an inner surface of said housing means.

4. The anti-theft device according to claim 1 wherein said lower perimeter edge conforms to an upper surface of the transmission housing.

5. The anti-theft device according to claim 1 wherein said housing means is constructed of a single piece of rigid opaque material.

* * * * *